June 23, 1942.   H. S. JANDUS   2,287,037
VARIABLE RATIO BRAKE LEVER
Filed April 15, 1940   3 Sheets-Sheet 1
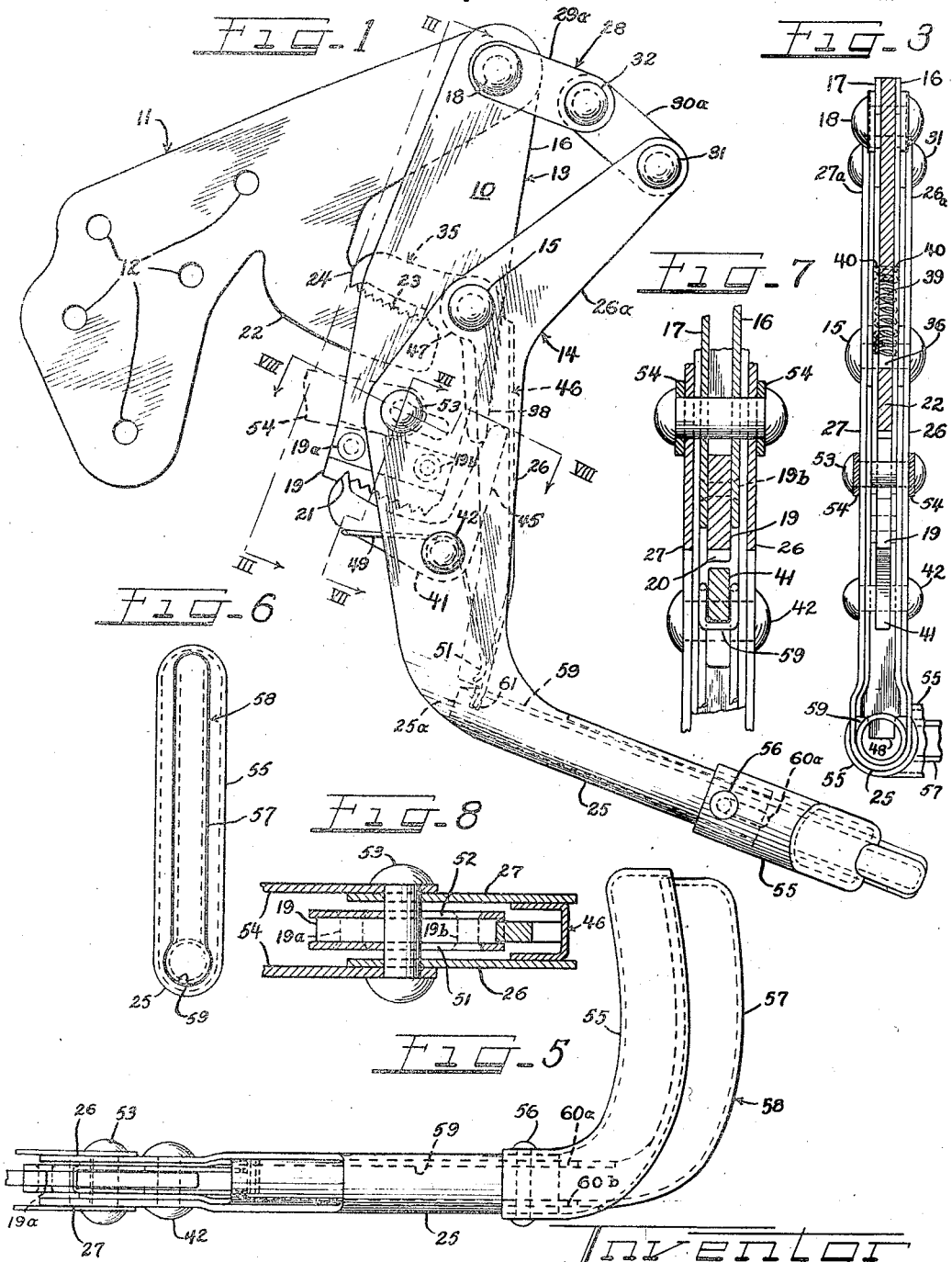
Inventor
Herbert S. Jandus
by Charles... Attys

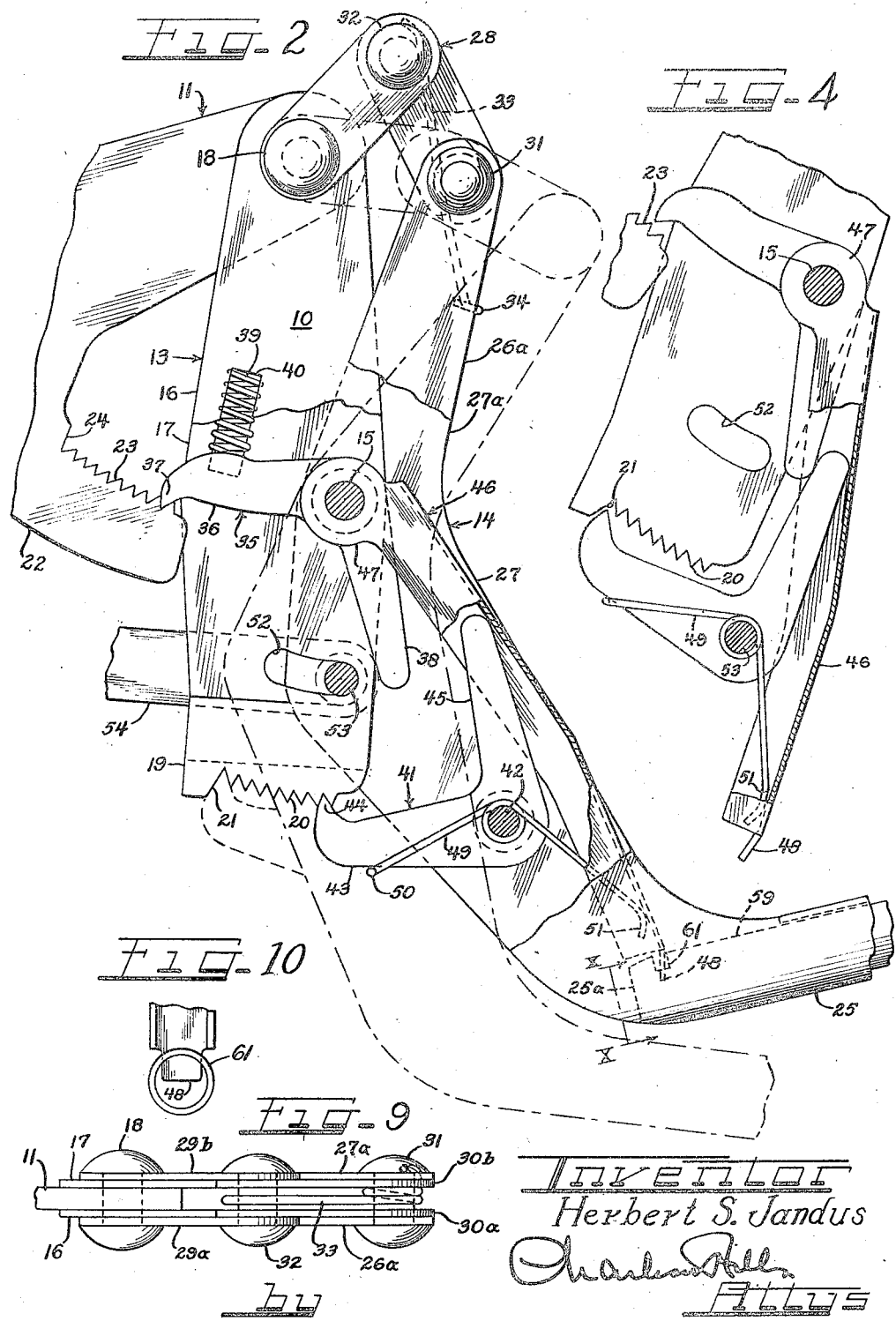

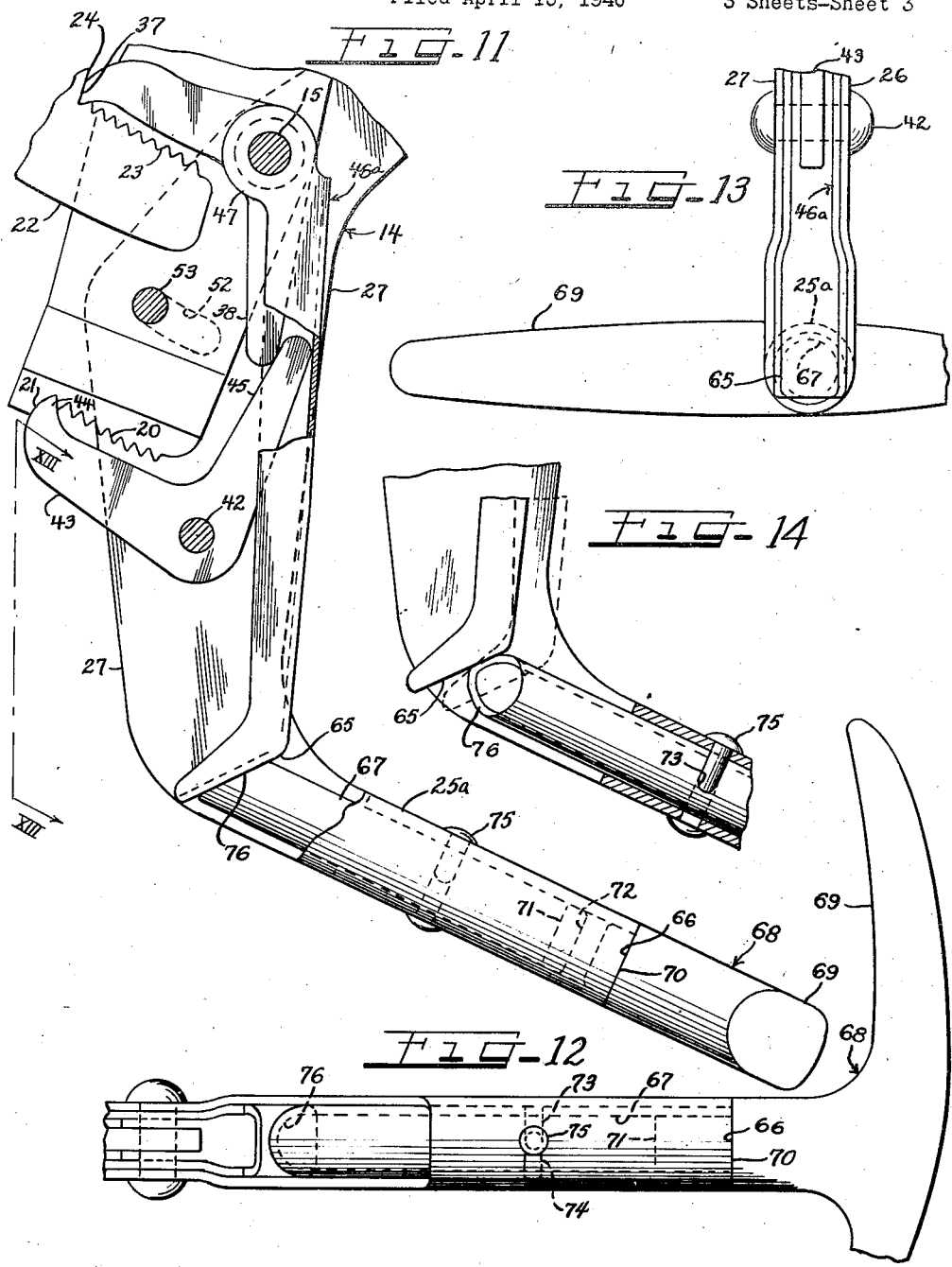

Patented June 23, 1942

2,287,037

UNITED STATES PATENT OFFICE 2,287,037

VARIABLE RATIO BRAKE LEVER

Herbert S. Jandus, Detroit, Mich., assignor to Houdaille-Hershey Corporation, Detroit, Mich., a corporation of Michigan Application April 15, 1940, Serial No. 329,617

22 Claims. (Cl. 74—516)

The present invention relates to a novel brake lever construction of the dash type. More particularly the invention relates to a jointed brake lever construction having variable ratios between operative effort and brake tension which change automatically as the mechanism is actuated.

Heretofore, in hand brake levers of the dash type, the applied operative force necessary for actuating the lever mechanism had to be progressively increased as the slack of the brake linkage was taken up and the brakes gradually applied. This was necessary by reason of such brake lever constructions having the provision of but a single ratio between the force applied by the vehicle operator swinging the main lever to actuate the brakes and the progressively increased tension exerted through the linkage mechanism as the brakes were actuated.

According to the present invention, a more efficient brake lever construction is effected which automatically creates a much higher reduction between the operating force and the tension of the brake actuating mechanism when the brakes are actually being applied than when slack is being taken up in the linkage mechanism.

It is, therefore, an object of this invention to provide a novel and simple brake lever construction employing variable operative lever ratios as the mechanism is being actuated.

Another object of the present invention is the provision of a brake lever construction having variable operative ratios which automatically increase when a predetermined operative effort has been reached.

A further object of this invention is to provide an improved two-part pivoted brake lever construction capable of being partially actuated as a unitary lever having one ratio between operative effort and brake tension, and capable of being further actuated by one of the lever parts only whereby a much higher ratio is made effective.

A still further object of the present invention is the provision of a brake lever construction having pivoted lever parts maintained in one relative position by a preloaded toggle linkage connection and swingable on a common pivot as a unitary lever, with one of the parts being swingable alone on a different pivot when the operative force applied is greater than the toggle linkage load.

Another and still further object of this invention is the provision of a brake lever construction having pivoted lever parts employing a plurality of clutching members, some of which cooperate to hold one of the lever parts in adjusted position while the other lever part is swung in a direction for actuating the brakes.

Still another object of this invention is the provision of a brake lever construction having two pivoted lever parts, each lever part employing separate clutching means for holding it in adjusted position, and also having a novel clutch release member which progressively disengages the separate clutching means as the lever mechanism is actuated in a brake releasing direction.

A still further object of this invention is the provision of a brake lever construction with novel means for releasing the lever mechanism from any adjusted position.

The novel features believed to be characteristic of the present invention are set forth with particularity in the appended claims. The invention itself, however, both as to its organization and manner of construction, together with further objects and advantages thereof, may best be understood by reference to the following description taken in connection with the accompanying drawings, in which:

Figure 1 is a view in side elevation of a brake lever construction embodying the principles of this invention;

Figure 2 is an enlarged fragmentary side view similar to Figure 1, with portions broken away and parts in vertical cross-section, illustrating, in full lines, the relative position of parts when the lever mechanism has been moved to a position in which the brakes are fully actuated, and, in dotted lines, the relative position of one of the lever parts immediately prior to its actuation alone;

Figure 3 is a view, partially in section and partially in edge elevation, taken substantially in the plane indicated by the line III—III of Figure 1;

Figure 4 is a fragmentary side view similar to Figure 2, with parts in elevation and other parts in vertical section, illustrating the relative position of the cooperating clutching parts when in a position in which the lever mechanism is in a fully released position;

Figure 5 is a bottom view of the device illustrated in Figure 1;

Figure 6 is an end view in elevation of the device illustrated in Figure 5;

Figure 7 is an enlarged fragmentary cross-sectional view, with parts in elevation, taken substantially in the planes indicated by the line VII—VII of Figure 1;

Figure 8 is an enlarged fragmentary cross-sectional view, with a part in elevation, taken substantially in the planes indicated by the line VIII—VIII of Figure 1;

Figure 9 is an enlarged plan view illustrating the toggle linkage shown in Figure 1;

Figure 10 is a fragmentary end view as seen when looking in the direction of the arrows along the line X—X shown in Figure 2;

Figure 11 is a fragmentary view, somewhat similar to Figure 2, illustrating a modified form of pawl release mechanism;

Figure 12 is a view similar to Figure 5 and illustrates a bottom view of the handle and pawl release construction shown in Figure 11;

Figure 13 is a fragmentary end elevational view looking in the direction of the arrows as seen along the line XIII—XIII of Figure 11; and, Figure 14 is a fragmentary view similar to Figure 11 and illustrates the position of parts when the release mechanism has been operated.

Referring now to the general embodiment of the present invention as illustrated in Figures 1 to 10 of the drawings, there is disclosed a brake lever construction 10 of the "dash-type," that is, a lever which is pivoted behind the instrument board of an automotive vehicle having a grip portion projecting below and beyond the instrument board.

Referring particularly to Figure 1, the brake lever construction 10 is pivotally connected to, in depending relation from, a mounting plate or bracket 11 of flat metal stamped to proper size and form and provided with apertures or bolt holes 12 whereby it may be secured in place behind the vehicle instrument board (not shown). The brake lever 10 consists of two parts, an upper lever member 13 and a lower lever member 14 which are pivotally connected together by a suitable pivot pin or rivet 15.

The upper brake lever member 13 consists of flat metal plates or legs 16 and 17 which straddle the supporting bracket 11 and hang in pivotal depending relation therefrom by a pivot 18.

A flat bar 19 is provided on its lower edge with a series of teeth 20 and a stop portion 21, and is connected to and between the ends of the legs 16 and 17 by flat head rivets 19a and 19b. As described, the upper lever member 13 is U-shaped in cross section having a lower edge formed as a sector.

An integral projecting portion 22 of the supporting bracket 11 extends forwardly between the legs of the upper lever member 13 and is provided on its upper edge with a series of teeth 23 and a stop portion 24 which constitutes an upper sector member.

The lower lever member 14 is provided with a tubular end portion 25 whose side walls extend angularly away therefrom to form spaced legs 26 and 27. The spaced parallel legs 26 and 27 terminate in angularly offset portions 26a and 27a.

A toggle linkage 28 serves to normally hold the upper ends of the upper lever member 13 and the lower lever member 14 in spaced relation, as shown in Figure 1. As best shown in Figure 9, the toggle linkage consists of a pair of links 29a and 29b each being supported at one of their ends by the pivot pin 18.

A second pair of links 30a and 30b are each pivotally supported at one of their ends to and between the legs at the upper end of the lower lever member 14 by a pivot 31.

The other ends of both pairs of links are connected by a pivot 32.

A wire spring 33 has its central portion coiled around the pivot 31 with its end portions extending away therefrom, one end of which bears against the pivot 32 and its opposite end is connected to the upper portion of the lower brake lever member 14 in a manner as shown at 34, which may be any suitable connection such as a hook engagement. The wire spring 33 urges the pairs of links in a position near their dead center, that is, nearly to a position in which the center lines of the links would coincide. As shown in Figure 1, this position is slightly above dead center and the cooperation of the parts is such that the links always remain above dead center and never break beyond or below this line.

An upper L-shaped pawl 35 is supported at its angle by the pivot pin 15 which pivotally connects the upper and lower lever members together. One of its legs 36 is provided with a downwardly extending tooth portion 37 adapted for engagement with a tooth 23 on the sector formed on the extending portion 22 of the bracket 11. The other angularly extending leg or tail piece 38 extends downwardly for a purpose to be explained more fully hereinafter.

A coil spring 39 (Figure 2) having a diameter greater than the space between the legs 16 and 17 of the upper brake lever member, is positioned therebetween and held in place by a pair of narrow slots 40 provided in the legs and through which side portions of the spring partially extend (Figure 3). The lower end of the spring 39 engages the upper edge of the pawl leg 36 to urge the toothed portion of the pawl into normal engagement with a sector tooth 23.

A lower pawl 41, shaped in the same manner as the upper pawl 45, is inverted and connected at its angle to and between the spaced side walls of the lower lever member 14 by a pivot 42. The pawl 41 is shaped to provide a horizontally extending leg 43 which terminates in a tooth 44 adapted for engagement with a sector tooth 20. The other angularly extending leg of the pawl 41 provides a tail piece 45 whose purpose is defined in greater detail hereinafter.

A U-shaped release member 46 is provided at one end with spaced rounded legs 47, only one of which is shown as in Figures 1, 2 and 4, which pivotally straddle the upper pawl member 35 from the pivot 15. The other end of the release member 46 has an extending web portion 48 for a purpose to be more fully explained hereinafter and which is illustrated most clearly in Figures 2, 4 and 10.

A wire spring 49 has its central portion coiled around the pivot 42 supporting the lower pawl 41 and has angularly extending end portions, one of which is provided with a hook 59 engaging the lower edge of the pawl leg 43 and its other end curved inwardly as at 51 to bear against the web of the release member 46. The spring 49 serves to hold the lower pawl in normal toothed engagement with the lower sector and also serves to urge the release member 46 to the right.

A pair of elongated slots 51 and 52 (Figures 2, 4 and 8) are provided in the legs 16 and 17 of the upper brake lever member and are each described by a radius struck from the center of the pivot 15. Suitable apertures are provided in the spaced legs of the lower lever member to register with the slots 51 and 52 to receive therethrough a pivot pin 53. A clevis 54 straddles the lower lever member 14 and is connected to the pivot 13 by means of which the braking mechanism of the vehicle (not shown) is actuated.

The lower tubular end 25 of the lower lever member 14 has a curved handle 55 connected to its extremity by means of a rivet 56. The curved portion of the handle 55 is of U-shape in cross section which receives in nested relation therewith the curved end 57 of a clutch release member 58.

The clutch or pawl release member 58 is shaped to provide a tubular portion 59 which is integrally connected to and extends from the U-shaped handle 57. The tubular portion 59 slidingly engages within the tubular portion 25 of the lower lever member and is provided with opposed longitudinally extending wall slots 60a and 60b which receive therethrough the rivet 56 for defining limits of axial movement of the pawl release member 58.

At its forward or free end 25a, the tubular portion 59 of the pawl release member is provided with a transverse slot 61 through which extends the web extension 48 of the release lever 46. It is to be noted in Figure 2 that the curved end 51 of the wire spring 49 normally urges the release lever 46 to the right. In so doing, the web extension 48 (Figure 10) engages a side of the transverse slot 61 to urge the pawl release member 58 in a projected position ready for actuation (Figure 1).

The operation of the device will now be explained. The brake lever construction illustrated in Figure 1 is in a fully brake released position, the predetermined load of the toggle linkage 28 maintaining the upper and lower brake lever members in locked angular relation for operation as a unitary lever in a brake actuating direction. In this position, the upper pawl 35 is held in toothed engagement with a sector tooth 23 against the stop 24 and the lower pawl 49 is held in toothed engagement with a tooth 20 against the stop 21.

By grasping the handle 55, which is disposed crosswise of the vehicle in order to conserve leg room, and pulling the unitary lever 10 to the right or in a brake actuating direction the brakes are actuated through movement of the clevis 54 connected to the brake linkage mechanism. In this movement, the unitary lever 10 is swung about its pivot 18 and the upper pawl 35 ratchets over the teeth 23 while the lower pawl 49 is maintained in toothed engagement as illustrated.

When brake tension, as exerted through the clevis 54, is such that the pull on the handle 55 is greater than the load exerted by the wire spring 33 on the toggle linkage 28 the latter breaks upwardly, the upper lever member is held in adjusted position by the cooperation between the pawl 35 and a ratchet tooth 23, and the lower lever member then swings about its pivot 15.

It is to be noted that the automatic change from the pivot 18 to the pivot 15 effects a higher reduction of operative effort to brake tension than when the unitary lever 10 is swung about the pivot 18.

Continued movement to the right causes the lower pawl 41 to ratchet over the teeth 20 and also causes displacement of the pivot 53 from one end of the elongated slot 52 to its other end to further actuate the clevis 54 and thereby positively apply the brakes.

During movement of the brake lever mechanism from a full released position to a full actuated position, the upper and lower pawls are consecutively operated.

Movement of the lower lever member 14 about its pivot 15 is illustrated in Figure 2, the broken lines illustrating diagrammatically the position of parts at the beginning of the movement and, in full lines, the position of parts when the brakes are fully actuated.

As clearly shown in Figure 1, the upper and lower pawls have extending arms or tail pieces which rest in edge engagement one against the other when the brake lever mechanism is in a full brake released position. Both pawls remain in the same relative position to each other during movement of the brake lever construction as a unitary lever. When, however, the lower lever member moves about its own pivot 15 the upper pawl remains stationary while the lower pawl moves relative to the sector formed on the lower edge of the upper brake lever member.

When the brakes are fully actuated, the parts assume the position as shown in full lines in Figure 2 and the tail pieces of the upper and lower pawls are separated by the same distance the lower lever member moves relative to the upper lever member.

To release the lever mechanism for movement to the left or in a brake releasing direction, the operator merely squeezes his grip to urge the curved handle 57 into the handle 55, and, in so doing, the tubular portion 59 of the clutch release member 58 moves inwardly to rock the release lever 46 about its pivot 15 to thereby disengage the lower pawl 41 from its engagement with a tooth 20 of its engaging sector. This is accomplished by the web portion of the release lever rocking the tail piece 45 of the lower pawl about its pivot 42.

With the parts in this position, the operator pushes on the handle of the lower lever member until the tail piece 45 of the lower pawl engages with the tail piece 38 of the upper pawl. Continued movement to the left then rocks the upper pawl 35 out of engagement with a tooth 23 and thereafter the brake lever assembly 10 is moved into a position in which the brakes are completely released, as shown in Figure 1.

A modified form of pawl release mechanism is illustrated in Figures 11 to 14 and like parts bear the same reference numerals as shown in the preceding figures.

A release lever 46a is provided at its lower end with a foot portion 65 which is bent angularly inward as shown in Figures 11 and 14. The foot portion, like the body of the release lever, is also U-shaped in cross-section.

The lower tubular portion 25a of the lower lever member 14 terminates in a square end 66 and embraces the tubular portion 67 of a release member 68 in such a manner as to allow rotation therein.

At one end, the release member 68 is provided with a curved handle 69 which terminates in a shoulder 70 and an extension 71 arranged to fit within the tubular portion 67 and be connected thereto by a flat-headed rivet 72. The shoulder 70 abuts against the square end 66 of the tubular portion of the lever 14 to absorb any pushing force applied to the handle 69.

Intermediate its ends, the tubular portion 67 of the release member is provided with opposed slots 73 and 74 which register with suitable apertures in the tubular portion 25a of the lower lever member. A rivet 75 extends through and coacts with the slots and apertures to define limits of rotation and restrict endwise movement between the tubular portions 25a and 67. It is to be noted that each of the slots 73 and 74 extend in a circumferential direction a distance of approximately 90 degrees to restrict rotation of the handle 69 to a quarter turn.

The tubular portion 67, at its inner free end 76, is angularly disposed to normally seat against the offset end 65 of the release lever 46a as shown in Figure 11. When the handle 69 is turned a quarter turn or within the limits defined by slots 73 and 74, the angularly disposed end 76 cams against the foot portion 65 of the release lever to push it forwardly or to the left as diagrammatically illustrated in Figure 14.

In so doing, release of the pawls 35 and 41 is accomplished in the same manner as described previously. Likewise, the actuation of the upper and lower lever members is also accomplished in the same manner as described in the previous embodiment.

It will be seen from the foregoing description that the present invention contemplates a brake lever construction of pivotal lever members capable of being consecutively operated with an automatic change in operative ratios as the tension exerted by the brake mechanism changes, with each lever member being held in adjusted position by its own pawl and ratchet.

While particular embodiments only of this invention have been illustrated, it will, of course, be understood that the invention should not be limited thereto, since many modifications may be made and, therefore, it is contemplated by the appended claims to cover all such modifications as fall within the true spirit and scope of the present invention.

I claim as my invention:

1. A brake lever construction comprising a support, a lever pivotally mounted on said support, a second lever pivotally mounted on said first lever and arranged for connection to a brake setting member, said second lever also being arranged for manual actuation, yieldable spring pressed toggle means for holding said levers in a fixed angular position with respect to each other, means for holding said first lever in an adjusted position with respect to said support, said yieldable toggle means being rendered ineffective to hold said levers in said fixed angular relation when the brake applying force exceeds a predetermined value whereby the fulcrum point of said second lever is shifted from said first pivotal mounting to said second pivotal mounting to change the leverage ratio.

2. A brake lever construction having linkage mechanism for actuating brakes comprising lever members pivoted to each other intermediate their ends, a support, one of said levers being pivoted at one of its ends to said support, and releasable means connecting adjacent ends of said lever members for holding them in fixed angular relation to each other for joint operation as a unit in one direction for partially actuating said linkage mechanism, said means being rendered ineffective by operative effort for releasing said members from joint unitary operation to enable further movement in the same direction of one of said members for fully actuating said linkage mechanism.

3. A brake lever construction for actuating and releasing brakes comprising lever members having spaced legs pivoted together at intermediate portions in straddling relation, means connecting adjacent spaced ends of said lever members holding them together for unitary movement for actuating and releasing the brakes at a low leverage ratio, said means being rendered inoperative to permit movable adjustment of one of said adjacent spaced ends toward the other when a predetermined operative load is reached, and one of said lever members being operable when said means are rendered inoperative for further actuating and releasing said brakes at a higher leverage ratio.

4. A brake lever construction comprising pivoted lever members, a pivoted clutching member with each of said lever members for holding them in adjusted positions, link means pivoted to each other and to said lever members and being operative for holding said members together for unitary movement about a common pivot, said link means being rendered inoperative when a predetermined operative load is reached, and one of said lever members being operable about a pivot other than said common pivot when said link means are rendered inoperative and the other of said lever members is held in adjusted position.

5. A brake lever construction for actuating brakes by movement in one direction comprising pivoted lever members, pre-loaded pivoted means connecting and being operative for holding said members together for unitary movement about a single pivot for partially actuating said brakes, cooperating clutching members for holding said held members in adjusted position, said means being pivotally rocked to a position for rendering them inoperative when the effort for actuating said unitary lever movement exceeds the preload thereof, one of said lever members being rendered operative on a pivot other than said single pivot when said means are rendered inoperative for further movement in said one direction for fully actuating said brakes, and additional cooperating clutching members for holding said one lever member in adjusted position.

6. A brake lever construction for actuating brakes by movement in one direction comprising a support having a ratchet formed on an edge thereof, a first lever having a ratchet formed on an end thereof and being pivoted to said support at its other end, a second lever pivoted to said first lever intermediate their ends, pivoted means connecting said levers for holding them together for movement as a unitary lever when in one position and rendering said second lever free for relative movement to said first lever when in any but said one position, a pawl adapted to engage the support ratchet for holding said first lever in adjusted position, a second pawl adapted to engage the ratchet on said first lever for holding said second lever in adjusted position, said pawls being adapted to engage their respective sectors successively as said levers are moved in said one direction.

7. A brake lever construction comprising lever members pivotally connected to each other, one of said lever members being independently pivotally connected to a support, link members pivoted to each other and to said lever members for connecting the lever members together, said pivoted link members when near the position of axial alignment holding said lever members together for unitary movement around the pivotal connection of said one lever member to the support, and said pivoted link members when in any but said position of near axial alignment rendering the other of said lever members free for movement relative to said one lever member around the pivotal connection therebetween.

8. A brake lever construction having linkage mechanism for actuating brakes comprising two members, one of said members being arranged for pivotal connection at one of its ends to a support, clutching members for holding said one member in adjusted position, the other of said members and said one member being intermediately pivoted to each other independent of the support, additional clutching members for holding said other member in adjusted position, said members being adapted for movement as a unitary lever, and said other member being adapted for movement relative to said one member when the latter is held in stationary adjusted position.

9. A brake lever construction comprising lever members having a pivotal connection therebetween, toggle links pivotally connected to each other and to said lever members adjacent said first-mentioned pivotal connection, and spring means bearing on the pivotal connection of said toggle links normally urging the latter to a position adjacent axial dead center for holding the lever members together for unitary movement, said toggle links being movable to positions other than said adjacent dead-center position when the pressure of said spring means is overcome thereby rendering one of said lever members free for movement relative to the other of said lever members.

10. A brake lever construction for actuating brakes comprising a support having a ratchet formed on an edge thereof, a first lever having a ratchet formed on an edge thereof and pivoted to said support to swing, a second lever pivoted to said first lever, toggle linkage connecting said first and second levers and operable only on one side of its dead center, said toggle linkage when closely adjacent its dead center holding said levers together for movement as a unitary lever and when in any other position rendering said second lever free for movement relative to said first lever, a pawl adapted to engage the support ratchet for holding said first lever in adjusted position, an additional pawl adapted to engage the ratchet on said first lever for holding the second lever in adjusted position, said pawls being adapted to engage their respective ratchets consecutively as said levers are moved in one direction, and means for consecutively disengaging said pawls when said levers are moved in the reverse direction.

11. A toggle joint for a brake lever construction having levers intermediately pivoted to each other comprising links having end to end pivotal connection for jackknife action, the ends of said links opposite said pivotal connection being pivotally connected to adjacent ends of the pivoted levers, and means normally holding said links adjacent their dead center for holding the pivoted levers together for unitary movement, said links being arranged to be jackknifed when the holding means are rendered inoperative thereby permitting free relative movement between the pivoted levers.

12. A toggle joint for a brake lever construction having pivoted lever members comprising links having end to end pivotal connection and adapted to be jackknifed, the ends of said links opposite said pivotal connection being pivotally connected respectively to the pivoted lever members, said links being arranged to jackknife on but one side of their dead center, a spring for normally holding said links closely adjacent their dead center for holding the pivoted lever members together for unitary movement, said links when jackknifed to overcome said spring pressure rendering the pivoted lever members free for relative movement.

13. A brake lever construction having linkage mechanism for actuating brakes including a support having an edge formed as a toothed sector, a brake lever comprising first and second lever members, said first lever member being pivoted to said support and said second lever member being pivoted to said first lever member, said first lever member having an edge formed as a toothed sector, said second lever member terminating in a handle, a pawl supported by the pivot connecting said lever members, spring means normally urging said pawl into engagement with said support sector for holding said first lever member in adjusted position, an additional pawl arranged for pivotal connection to said second lever, spring means normally urging said additional pawl into engagement with said sector formed on the first lever member for holding said second lever member in adjusted position, means normally holding said lever members together for unitary movement, said means being rendered inoperative at a predetermined pulling effort on said handle when said lever members are moved as a unit for partially actuating said brakes, said means when so rendered inoperative rendering said second lever free for relative movement to said first lever member when the latter is held in adjusted position and about the pivot connecting said lever members for fully actuating said brakes, and release means operative at said handle and operatively connected to said pawls for releasing them whereby movement of said levers releases said brakes.

14. A brake lever construction comprising a support, a first lever of U-shaped configuration straddling said support and being pivotally connected thereto, said first lever having opposed elongated slots provided in its leg portions, a sector formed on said first lever, an extension of said support projecting between the legs of said first lever and shaped to provide a sector thereon, a second lever having spaced legs at one end and a tubular portion at its other end, a handle on said tubular portion, said spaced legs of the second lever straddling said first lever and being pivotally connected thereto, a pivot passing through apertures provided in the spaced legs of said second lever and passing through the elongated slots provided in said first lever, linkage mechanism connected to said last pivot for actuating brakes, an L-shaped upper pawl supported by the pivotal connection of said levers having one leg provided with a tooth for engagement with the support sector and its other leg forming a tail-piece, a spring normally holding said pawl in toothed engagement with its sector, an L-shaped lower pawl pivotally supported on said second lever having one leg provided with a tooth for engagement with the sector on said first lever and its other leg forming a tail-piece, the tail pieces of said pawls being arranged for edge engagement when said levers are in one angular position relative to each other, a toggle joint connecting said levers and spring urged to normally hold said levers in said one angular relative position, a U-shaped release lever pivotally supported by the pivotal connection between said levers, and means on said handle for rocking said release lever about said pivot, said levers when in said one angular relative position being arranged for movement as a unitary lever in one direction for partially applying said brakes, said toggle joint being rendered inoperative at a predetermined pulling effort on said handle for rendering said second lever free for relative movement to said first lever when the latter is held in adjusted position, said relative movement in said one direction further actuating said brakes to fully apply them, said means for rocking said release lever being actuated for successively rocking said pawls out of engagement with their respective sectors as said levers are moved in the reverse direction to release said brake.

15. A release mechanism for a brake lever construction comprising levers pivotally connected for movement relative to each other, a separate clutching mechanism with each lever for holding it in adjusted position, a release member endwise movable within one of the pivoted levers, and a member between said release member and said clutching mechanisms for successively operatively connecting the release member with each of the clutching mechanisms as the one pivoted lever is swung in one direction.

16. A release mechanism for a brake lever construction having pivoted levers and separate clutching members for holding them in adjusted position, comprising an endwise movable tubular member, and a U-shaped pivoted release lever operatively connected to said tubular member, said tubular member when moved in one endwise direction rocking said release lever to a position for successively disengaging the clutching members as one of the pivoted levers is moved in one direction.

17. A release mechanism for a brake lever construction having pivoted levers and separate clutching members for holding them in adjusted position, comprising a tubular member carried by one of the pivoted levers and arranged for endwise movement, means at one end of said tubular member for moving it in an endwise direction, said tubular member having a slot at its other end and a pivoted release lever having one end seated within said slot, said tubular member when moved in one endwise direction rocking said release lever to a position for successively disengaging the clutching members as the pivoted levers are moved in one direction.

18. A release mechanism for a brake lever construction having pivoted levers and separate clutching members for holding them in adjusted position, comprising a tubular member carried by one of the pivoted levers and arranged for limited rotational movement, handle means at one end of said tubular member for so moving it, a pivoted release lever, and cam means at the other end of said tubular member arranged to rock said release lever when said member is rotated to a position for successively disengaging the clutching members as the pivoted levers are moved in one direction.

19. A release mechanism for a brake lever construction having pivoted levers and separate clutching members for holding them in adjusted position, comprising a tubular member carried by one of the pivoted levers and arranged for limited rotation relative thereto, handle means at one end of said tubular member for swinging the levers about their pivots and for rotating said tubular member, a slanting cam edge formed at the other end of said tubular member, and a pivoted release lever having one end normally seated against said slanting cam edge, said cam edge when rotated rocking said release lever to a position for successively disengaging the clutching members as the pivoted levers are moved in a releasing direction.

20. A multiple clutching construction for a brake lever mechanism including pivoted pawls mounted in spaced relation on a supporting structure, said pawls having portions in overlapping arrangement, a fixed ratchet engageable by one of said pawls, a movable ratchet engageable by the other of said pawls, the pairs of cooperable pawls and ratchets being arranged to alternately engage for unitary movement and to disengage for relative movement, and means for successively actuating said overlapping pawl portions to rock the pawls out of engagement with their respective ratchets.

21. A multiple clutching construction for a brake lever including a pivoted pawl and a fixed ratchet being arranged for cooperation and for relative movement, and a second pivoted pawl and a movable ratchet being arranged for cooperation and for relative movement, said second pawl and movable ratchet also being arranged to move as a unit when said first pawl and said fixed ratchet are moved relatively with respect to each other and to move relatively with respect to each other when said first pawl and fixed ratchet cooperate in holding engagement, said pawls having portions arranged for abutment with each other whereby the pawls are rocked out of engagement with their respective ratchets when force is applied at said abutting portions.

22. A lever construction for actuating and releasing an associated mechanism comprising a pivoted lever mechanism, spaced clutch members pivoted to said lever mechanism and being operable for holding the lever mechanism in an adjusted position, and a release member co-pivotally supported with one of said clutch members for separately actuating one of the clutch members and for simultaneously actuating both of the clutch members for releasing the lever mechanism from its adjustably held position.

HERBERT S. JANDUS.